United States Patent Office 3,428,633
Patented Feb. 18, 1969

3,428,633
SALTS OF ENAMINOKETONES AND PROCESSES FOR THEIR PREPARATION
Angelo John Speziale and Gerhard H. Alt, Creve Coeur, Mo., assignors to Monsanto Company, St. Louis, Mo., a corporation of Delaware
No Drawing. Continuation-in-part of application Ser. No. 524,932, Dec. 16, 1965, which is a continuation-in-part of application Ser. No. 218,547, Aug. 22, 1962. This application Dec. 19, 1966, Ser. No. 602,506
U.S. Cl. 260—247      14 Claims
Int. Cl. A23k 1/16

ABSTRACT OF THE DISCLOSURE

Enaminoketone salts having the formula:

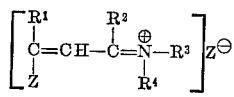

wherein $R^1$ and $R^2$ are each alkyl groups having a maximum of 4 carbon atoms or together forms a ring having at least 4 and a maximum of 8 carbon atoms; $R^3$ and $R^4$ are each alkyl groups having a maximum of 4 carbon atoms or together form an alkylene, oxaalkylene or thialkylene having at least 2 and a maximum of 7 carbon atoms; and Z is chlorine or bromine.

These compounds are prepared by the reaction of the corresponding enaminoketone with an acid chloride or bromide of a carboxylic acid having a pKa of less than 1.3.

---

This application is a continuation-in-part of applicants' copending application Ser. No. 524,932 filed Dec. 16, 1965 which, in turn, is a continuation-in-part of application Ser. No. 218,547, filed Aug. 22, 1962, and now abandoned.

This invention relates to a new family of chemical compounds and a novel procedure for their preparation. These compounds are useful as animal feed additives (to stimulate growth), usually being added to the feed in a concentration of 0.5 to 2.0 weight percent of the feed. They also are utilized as antioxidants and in the control of microorganism, especially bacteria.

In accordance with this invention enaminoketones are reacted with acid bromides or acid chlorides of strong carboxylic acids to effect a conversion of the ketooxygen substituent to a halogen substituent. The expression "strong acids" identifies the carboxylic acids having high hydrogen ion concentrations in aqueous solutions. The acids for the practice of this invention are those with pKa values less than 1.3 and preferably less than 1.0. The novel procedure involves the reaction of the acid halides of the said strong acid with an enaminoketone in accordance with the equation:

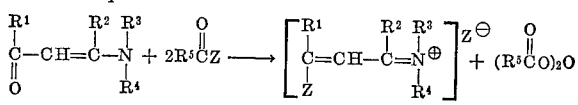

wherein Z is an atom selected from the group consisting of chlorine and bromine; wherein $R^1$ and $R^2$ are selected from the group consisting of alkyl radicals of up to four carbon atoms and radicals such that $R^1$ and $R^2$ together form an alkylene or alkylidene radical from two to eight carbon atoms to provide a ring of 4 to 8 carbon atoms; wherein $R^3$ and $R^4$ are selected from the group consisting of alkyl up to four carbon atoms and radicals such that $R^3$ and $R^4$ together form radicals of two to seven carbon atoms selected from the class consisting of alkylene, oxaalkylene and thiaalkylene radicals; and wherein $R^5$ is an organic radical attached to the carbonyl group of a carboxylic acid having a pKa value less than 1.3.

The reaction is conducted in an organic solvent such as benzene, toluene, carbon tetrachloride, ethylene dichloride, hexane and other hydrocarbons and halogenated hydrocarbons. The reagents are heated to the reflux temperature if necessary to effect a reaction. Either the acid bromides or the acid chlorides may be used. The reaction produces a compound with the halogen of the acid halide replacing the ketone oxygen and providing the anion of the amine salt. The reaction products are hydroscopic and are often difficult to crystallize as chlorides or bromides.

It has been found that the amine chlorides and bromides can be conveniently converted to salts which are more easily crystallizable and easily purified by recrystallizations. These salts are prepared according to the following equation:

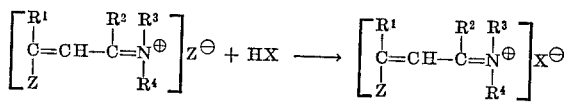

wherein X is an anion selected from the group consisting of acid sulfate ($HSO_4^-$), perchlorate ($ClO_4^-$) and nitrate ($NO_3^-$); and $R^1$, $R^2$, $R^3$, $R^4$ and Z are as previously defined. The sodium salt can be used in place of the acid HX.

The chloride or bromide salt is dissolved in water and the sodium salt or the free acid (HX) is added precipitating the new salt from the aqueous solution in a uniform crystalline state. Further purification can be accomplished by recrystallization from ethyl acetate, benzene, hexane and mixtures of ethanol and ethyl acetate.

In a modification of the above procedure, the chloride or bromide salt is not isolated from the reaction medium. The solvent is removed and water added to the residue. The acid HX, or its sodium salt is then added to the aqueous mixture and the product obtained as above.

A preferred class of these compounds are those of the structure:

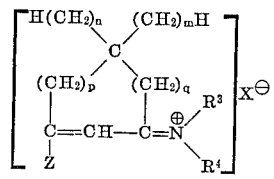

wherein p, q, n and m are integers from zero to two with the sum of m and n being at least one when p and q are zero, and $R^3$, $R^4$, X and Z are as defined above.

The acid chlorides or bromides useful in the novel procedures are the acid chlorides or bromides of strong acids, i.e., those which are highly ionized in aqueous solutions. These acids have pKa values of less than 1.3 and preferably those of pKa values below 1.0 and include the following:

trichloracetic acid
  p-toluenesulfonic acid
  tribromacetic acid
  trifluoroacetic acid
  benzenesulfonic acid
  p-bromobenzenesulfonic acid
  p-nitrobenzenesulfonic acid
  p-methoxybenzenesulfonic acid
  o-chlorobenzenesulfonic acid
  2,4-dinitrobenzenesulfonic acid
  2,4-dichlorobenzenesulfonic acid Further details are set forth in the following specific examples.

Example 1

The enaminoketone of the structure

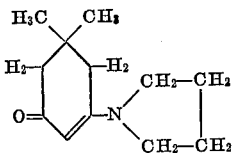

was dissolved in carbon tetrachloride (9.65 g. in 100 ml.). Over a period of 30 minutes, 10.5 gms. of trichloroacetyl chloride in 50 ml. of carbon tetrachloride was added. A solid precipitate was formed. The mixture was heated to 80° C. for 4 hours, cooled and then filtered to recover a solid, which was washed with benzene and dried in vacuo. It was dissolved in water containing perchloric acid from which solution it was precipitated as the perchloric acid salt and recrystallized from a mixture of ethyl acetate and ethanol. The product was identified as the perchloric acid salt of the formula:

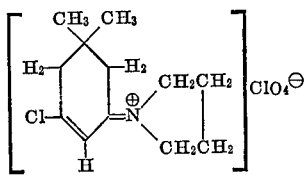

Example 2

The procedure of Example 1 was repeated except that the reaction was conducted in benzene solution. After evaporation of the benzene the precipitate was dissolved in chloroform and reprecipitated with ether. The chloride salt was recovered, M.P. 168–170° C.

Example 3

The procedure of Example 1 was repeated except that tosyl chloride was used in place of the trichloroacetyl chloride. Benzene was used as the reaction medium. After heating at reflux temperature the benzene was evaporated. Water was added and the aqueous solution treated with perchloric acid to precipitate the perchloric acid salt which was recrystallized from a mixture of ethyl acetate and ethanol and had a melting point of 187–188° C.

Examples 4 to 13

Using acid chlorides or bromides of strong carboxylic acids (pKa less than 1.3) and enaminoketones, the following compounds can be prepared:

4. $$\left[\begin{array}{c} CH_2\text{---}CH_2 \\ | \qquad | \\ C=CH-C=\overset{\oplus}{N} \\ | \qquad \diagdown \\ Cl \qquad \qquad C_2H_5 \\ \qquad \qquad C_2H_5 \end{array}\right] Cl^{\ominus}$$

5. $$\left[\begin{array}{c} CH_3 \;\; CH_3 \\ \diagdown \; C \; \diagup \\ CH_2 \;\; CH_2 \\ | \qquad | \qquad CH_2\text{-}CH_2 \\ C=CH-C=\overset{\oplus}{N} \\ | \qquad \diagdown \\ Cl \qquad \qquad CH_2\text{-}CH_2 \end{array}\right] Cl^{\ominus}$$

6. $$\left[\begin{array}{c} CH_3 \;\; CH_3 \\ \diagdown \; C \; \diagup \\ H_2C \;\;\; CH_2 \;\; CH_2\text{-}CH_2 \\ | \qquad | \qquad \diagup \\ C=CH-C=\overset{\oplus}{N}\text{---}CH_2 \\ | \qquad \diagdown \\ Cl \qquad \qquad CH_2\text{-}CH_2 \end{array}\right] Cl^{\ominus}$$

7. $$\left[\begin{array}{c} CH_3 \;\; CH_3 \\ \diagdown \; C \; \diagup \\ H_2C \;\;\; CH_2 \;\; CH_2\text{-}CH_2 \\ | \qquad | \qquad \diagup \\ C=CH-C=\overset{\oplus}{N} \;\;\;\; O \\ | \qquad \diagdown \\ Cl \qquad \qquad CH_2\text{-}CH_2 \end{array}\right] Cl^{\ominus}$$

8. $$\left[\begin{array}{c} H_2C\text{---}CH_2\text{---}CH_2 \;\; CH_2CH_2 \\ | \qquad \qquad | \qquad \diagup \\ C=CH-C=\overset{\oplus}{N} \\ | \qquad \qquad \diagdown \\ Cl \qquad \qquad \qquad CH_2CH_2 \end{array}\right] Cl^{\ominus}$$

9. $$\left[\begin{array}{c} H_2C\text{---}CH_2\text{---}CH_2 \;\; CH_2CH_2 \\ | \qquad \qquad | \qquad \diagup \\ C=CH-C=\overset{\oplus}{N} \;\;\;\; CH_2 \\ | \qquad \qquad \diagdown \\ Cl \qquad \qquad \qquad CH_2CH_2 \end{array}\right] Cl^{\ominus}$$

10. $$\left[\begin{array}{c} H_2C\text{---}CH_2\text{---}CH_2 \;\; CH_2CH_2 \\ | \qquad \qquad | \qquad \diagup \\ C=CH-C=\overset{\oplus}{N} \;\;\;\; O \\ | \qquad \qquad \diagdown \\ Cl \qquad \qquad \qquad CH_2CH_2 \end{array}\right] Cl^{\ominus}$$

11. $$\left[\begin{array}{c} C_2H_5 \quad C_2H_5 \quad CH_2\text{-}CH_2 \\ | \qquad | \qquad \diagup \\ C=CH-C=\overset{\oplus}{N} \\ | \qquad \diagdown \\ Br \qquad \qquad CH_2\text{-}CH_2 \end{array}\right] Br^{\ominus}$$

12. $$\left[\begin{array}{c} C_3H_7 \quad C_3H_7 \quad CH_3 \\ | \qquad | \qquad \diagup \\ C=CH-C=\overset{\oplus}{N} \\ | \qquad \diagdown \\ Br \qquad \qquad CH_3 \end{array}\right] Br^{\ominus}$$

13. $$\left[\begin{array}{c} CH_3 \;\; CH_3 \\ \diagdown \; C \; \diagup \\ CH_2 \;\; CH_2 \;\; CH_2\text{-}CH_2 \\ | \qquad | \qquad \diagup \\ C=CH-C=\overset{\oplus}{N} \\ | \qquad \diagdown \\ Br \qquad \qquad CH_2\text{-}CH_2 \end{array}\right] Br^{\ominus}$$

Examples 14 and 15

Other salts can be prepared from the chlorides and bromides by reacting them with strong inorganic acids such as sulfuric, nitric and perchloric acid. These salts are preferably synthesized by dissolving the chloride or bromide in a minimum quantity of water and adding an excess of the strong inorganic acid. In this manner the following are prepared.

14. $$\left[\begin{array}{c} CH_2\text{---}CH_2\text{---}CH_2 \;\; CH_2CH_2 \\ | \qquad \qquad | \qquad \diagup \\ Cl\text{-}C=CH\text{---}C=\overset{\oplus}{N} \;\;\; CH_2 \\ \qquad \qquad \qquad \diagdown \\ \qquad \qquad \qquad CH_2CH_2 \end{array}\right] HSO_4^{\ominus}$$

15. $$\left[\begin{array}{c} CH_2\text{---}CH_2\text{---}CH_2 \;\; CH_2\text{-}CH_2 \\ | \qquad \qquad | \qquad \diagup \\ Br\text{-}C=CH\text{---}C=\overset{\oplus}{N} \;\;\; O \\ \qquad \qquad \qquad \diagdown \\ \qquad \qquad \qquad CH_2\text{-}CH_2 \end{array}\right] NO_3^{\ominus}$$

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:
1. A compound of the formula:

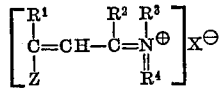

wherein Z is an atom selected from the group consisting of chlorine and bromine; X is an anion selected from the group consisting of $Cl^-$, $Br^-$, $NO_3^-$, $HSO_4^-$ and $ClO_4^-$; $R^1$ and $R^2$ are each selected from the group consisting of alkyl, having a maximum of four carbon atoms, and alkylene, having at least two and a maximum of eight carbon atoms formed by $R^1$ and $R^2$ together and arranged to provide a ring of four to eight carbon atoms; and $R^3$ and $R^4$ are each selected from the group consisting of alkyl, having a maximum of four carbon atoms, and alkylene, oxaalkylene and thiaalkylene having at least two and a maximum of seven carbon atoms formed by $R^3$ and $R^4$ together.

2. A compound, in accordance with claim 1, of the formula:

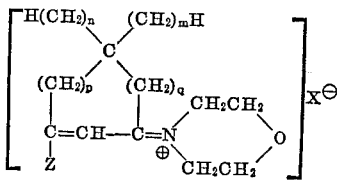

wherein $p, q, m, n$ are integers from zero to two with the sum of $m$ and $n$ being at least one when $p$ and $q$ are zero.

3. A compound, in accordance with claim 2, wherein Z is chlorine; $m, n, p, q$ are each one; and X is Cl.

4. A compound, in accordance with claim 1, of the formula:

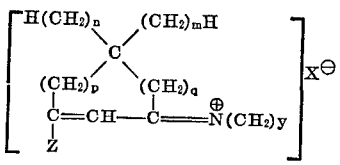

wherein $m, n, p, q$ are integers from zero to two with the sum of $m$ and $n$ being at least one when $p$ and $q$ are zero; and $y$ is an integer from two to seven.

5. A compound, in accordance with claim 4, wherein Z is chlorine; $m, n, p, q$ are each one; $y$ is four; and X is $Cl^-$.

6. A compound, in accordance with claim 4, wherein Z is Cl; $m$ and $n$ are each zero; $p$ and $q$ are each one; $y$ is four; and X is $Cl^-$.

7. A compound, in accordance with claim 4, wherein Z is Br; $m, n, p$ and $q$ are each one; $y$ is four and X is $Br^-$.

8. A compound, in accordance with claim 4, wherein Z is chlorine; $m, n, p$ and $q$ are each one; $y$ is four; and X is $ClO_4^-$.

9. A method of preparing a compound of the formula:

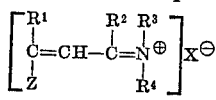

wherein Z is an atom selected from the group consisting of chlorine and bromine; X is an anion selected from the group consisting of $NO_3^-$, $HSO_4^-$ and $ClO_4^-$; $R^1$ and $R^2$ are each selected from the group consisting of alkyl, having a maximum of four carbon atoms, and alkylene, having at least two and a maximum of eight carbon atoms formed by $R^1$ and $R^2$ together and arranged to provide a ring of four to eight carbon atoms; and $R^3$ and $R^4$ are each selected from the group consisting of alkyl, having a maximum of four carbon atoms, and alkylene, oxaalkylene and thiaalkylene having at least two and a maximum of seven carbon atoms formed by $R^3$ and $R^4$ together; which comprises:

(a) Heating a compound of the formula

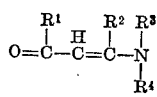

wherein $R^1$, $R^2$, $R^3$ and $R^4$ are as previously defined, with an acid halide of the group consisting of chlorides and bromides of a carboxylic acid having a pKa value less than about 1.3, to form a compound of the formula:

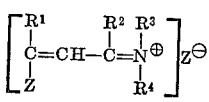

wherein $R^1$, $R^2$, $R^3$, $R^4$ and Z are as previously defined; and (b) Contacting the compound formed in step (a) with an acid selected from the group consisting of $H_2SO_4$, $HClO_4$ and $HNO_3$ and separating the desired product from the acid.

10. A method of preparing a compound, in accordance with claim 9, of the formula:

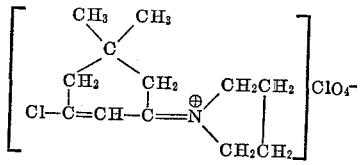

which comprises:

(a) Heating 5,5-dimethyl-3N-pyrrolidyl cyclohex-2-en-1-one with trichloroacetyl chloride to form a compound of the formula:

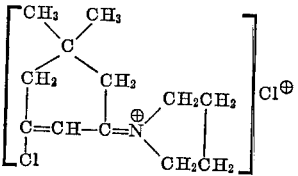

and (b) Contacting compound formed in step (a) with perchloric acid to yield the desired product.

11. A method of preparing a compound of the formula:

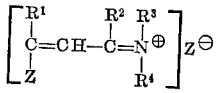

wherein Z is an atom selected from the group consisting of chlorine and bromine; $R^1$ and $R^2$ are each selected from the group consisting of alkyl, having a maximum of four carbon atoms, and alkylene, having at least two and a maximum of eight carbon atoms formed by $R^1$ and $R^2$ together and arranged to provide a ring of four to eight carbon atoms; and $R^3$ and $R^4$ are each selected from the group consisting of alkyl, having a maximum of four carbon atoms, and alkylene, oxaalkylene and thiaalkylene having at least two and a maximum of seven carbon atoms formed by $R^3$ and $R^4$ together; which comprises heating a compound of the formula:

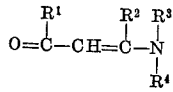

wherein $R^1$, $R^2$, $R^3$ and $R^4$ are as previously defined, with an acid halide of the group consisting of chlorides and bromides of a carboxylic acid having a pKa value less than about 1.3, to obtain the desired compound.

12. A method of preparing a compound, in accordance with claim 11, of the formula:

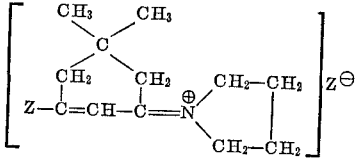

which comprises heating 5,5-dimethyl-3N-pyrrolidyl cyclohex-2-en-1-one with an acid halide of the group consisting of chlorides and bromides of a carboxylic acid having a pKa value less than about 1.3, to obtain the desired compound.

13. A method of preparing a compound, in accordance with claim 11, of the formula:

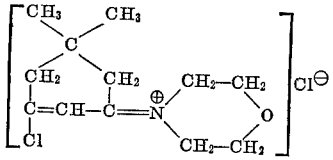

which comprises heating 5,5-dimethyl-3N-morpholyl cyclohex-2-en-1-one with trichloroacetyl chloride.

14. A method of preparing a compound, in accordance with claim 11, of the formula:
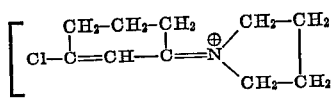
which comprises heating 3N-pyrrolidyl cyclohex-2-en-1-one with trichloroacetyl chloride.
References Cited
Alt. et al., J. Org. Chem., vol. 29, January–April 1964, pp. 794–797.
ALEX MAZEL, *Primary Examiner*
J. TOVAR, *Assistant Examiner.*
U.S. Cl. X.R.
99—2; 252—401; 260—239, 293, 243, 501, 326.8, 326.81, 999, 802